United States Patent [19]
Tolhuizen et al.

[11] Patent Number: 5,896,397
[45] Date of Patent: Apr. 13, 1999

[54] METHOD AND DEVICE FOR ERROR PROTECTION OF PROGRAMMABLE MEMORIES

[75] Inventors: Ludovicus M. G. M. Tolhuizen; Constant P. M. J. Baggen, both of Eindhoven, Netherlands

[73] Assignee: U.S. Philips Corporation, New York, N.Y.

[21] Appl. No.: 08/744,165

[22] Filed: Nov. 12, 1996

[30] Foreign Application Priority Data

Nov. 10, 1995 [EP] European Pat. Off. ............. 95203072

[51] Int. Cl.$^6$ .................................................. G11C 29/00
[52] U.S. Cl. ............ 371/21.2; 371/40.11; 371/37.2; 371/37.5; 371/37.4; 371/37.03; 371/37.11; 371/40.2; 360/53; 369/53; 369/54
[58] Field of Search ................. 371/40.11, 37.4, 371/37.2, 37.5, 37.03, 37.11, 40.2, 21.2; 360/53; 369/53, 54

[56] References Cited

U.S. PATENT DOCUMENTS

| 4,395,768 | 7/1983 | Goethals et al. | 371/45 |
|---|---|---|---|
| 4,567,518 | 1/1986 | Driessen | 358/133 |
| 5,022,031 | 6/1991 | Baggen | 371/43 |
| 5,467,360 | 11/1995 | Lokhoff | 371/37.4 |
| 5,469,448 | 11/1995 | Denissen et al. | 371/37.4 |
| 5,592,497 | 1/1997 | Lokhoff | 371/37.4 |

FOREIGN PATENT DOCUMENTS

| 0 603 932 A1 | 6/1994 | European Pat. Off. |
| 0603932A1 | 6/1994 | European Pat. Off. |

OTHER PUBLICATIONS

P. Larsson, "Construction based on codes of even distance", Ph.D. Thesis, Dept. of El. Eng., Linköping University (Sweden), 1995, pp. 44–46.

P. Larsson, "Construction of Codes for Localized Errors Based On Ordnary codes of Even Distance", Proc. EIDMA Winter Meeting on coding Theory, Information Theory, and Cryptology, Veldhven (NL), Dec. 1994, p. 30.

*Primary Examiner*—Reba I. Elmore
*Assistant Examiner*—McDieunel Marc
*Attorney, Agent, or Firm*—Anne E. Barschall

[57] ABSTRACT

For error-protected storing data, the data is encoded by an error protecting code to encoded data and stored in a medium. Next, the data is read out again and compared with the encoded data. If a particular discrepancy between stored data and encoded data is found, a discrepancy identifier is formed and stored with the stored data for raising the error protection by the error protecting code.

20 Claims, 2 Drawing Sheets

METHOD AND DEVICE FOR ERROR PROTECTION OF PROGRAMMABLE MEMORIES

BACKGROUND OF THE INVENTION

1. Field of the Invention

The invention relates to a method for error-protective encoding of data. The method includes:

encoding the data by an error protecting code to encoded data storing the encoded data in a medium as stored data reading the stored data from the medium and comparing with the encoded data.

2. Related Art

Various earlier encoding organizations have been disclosed in U.S. Pat. No. 4,567,518 (PHN 10221), EP-A1 437 865, corresponding U.S. patent application Ser. No. 08/419, 483 and U.S. Pat. No. 5,467,360 (PHN 13213), EP A1 603 932, corresponding U.S. patent application Ser. No. 08/167, 266 (PHN 14311), EP Patent Application 698,269, corresponding U.S. patent application Ser. No. 08/535,155 (PHN 15107), all assigned to the present assignee. Many recording schemes provide for a check read-out directly after writing. Upon detecting a discrepancy, the storing may be undertaken a second time, either at the same storage location, or at another storage location. The policy with respect to the latter choice is determined by various factors. A first one is the character of the interference, that may be hard or soft. A second one is the organization of the storage, that may be random accessible, quasi-random accessible, or serial. Still further considerations may play a part. The present invention has with respect to the above methodology taken into account the general requirement for saving space as well as time. In consequence, any required additional storage space should be limited. On the other hand, a full second storage run would often cost too much time. A different consideration is that many applications allow increasing the complexity of an encoder if thereby the complexity of the decoder can be lowered. In fact, encoders are often implemented in a professional environment, whereas decoders are rather more frequently used at consumer premises.

SUMMARY OF THE INVENTION

Accordingly, amongst other things it is an object of the present invention to raise the error protectivity of the code through belatedly storing a relatively small amount of extra data upon detection of a storage discrepancy. In consequence, according to one of its aspects, the invention includes upon detecting a particular discrepancy between stored data and encoded data generating a discrepancy identifier storing the discrepancy identifier in association with the stored data as stored identifier, thereby raising error protection offered by said error protecting code.

In many cases, the identifier is a small-size item, that raises redundancy only by a small amount. The philosophy of the invention is that the first write operation may already suffer from interference or malfunctioning. Moreover, upon later read-out, the situation can be aggravated, through aging of either hardware or medium, or through additional interference. In such case, the code should have at least some extra protectivity. The discrepancy identifier may then be used to show part of the errors, so that error protection vis à vis such further errors could get raised. In principle, the latter protection can be detection as well as correction.

Advantageously, absent detecting of a discrepancy, a dummy identifier is stored. This allows to use, upon decoding, the standard decoder that has been foreseen for the system. Advantageously, the error protecting code is a block code. As will be shown hereinafter, this allows for easy encoding as well as for easy decoding procedures. However, non-block coding schemes, such as for example, based on convolution codes would be feasible as well. For a disclosure of convolution type codes in a matrix memory environment, see U.S. patent Ser. No. 5,022,031 (PHN 12232) to the present assignee. A convolution type code for use in a linear medium environment has been described in U.S. Pat. No. 4,395,768 (PHN 9079) to the present assignee. Both documents describe encoding as well as decoding.

The invention also relates to a device for error-protective encoding of data. The device includes:

an error protecting encoder for encoding the data to encoded data memory apparatus for storing the data memory access apparatus for writing the encoded data in the memory as stored data and for reading the stored data from the medium comparing apparatus connected to said access apparatus for comparing the encoded data with the stored data. The device further includes secondary encoding apparatus fed by the comparing apparatus for generating a discrepancy identifier, under control of detection of a particular discrepancy between stored data and encoded data, for presentation to said memory access means. The memory access apparatus then stores the discrepancy identifier with the stored data a yielding stored identifier as additional error protection for said stored data. A device of this kind can be realized in a straightforward manner, starting from the idea of the present invention, and using elementary hardware.

The invention also relates to a method for decoding data that have been encoded according to the foregoing. The method includes reading and decoding the encoded data, and upon attaining correctly decoded data, forwarding that decoded data to a user, and furthermore accessing a discrepancy identifier stored in association with the encoded data, under control of the discrepancy identifier, amending the encoded data, to correctible data, and decoding the correctible data to correctly decoded data for forwarding to a user. The specific encoding scheme allows for a particularly straightforward and simple decoding strategy.

The invention also relates to a decoding device for data that have been encoded according to the foregoing; the device includes medium access apparatus for reading and decoding the encoded data, detection apparatus fed by the access apparatus for detecting correctly decoded data for forwarding said decoded data to a user, further detection/amending apparatus for accessing a discrepancy identifier co-stored with the encoded data, and under control of said discrepancy identifier, amending the encoded data to correctible data, and the decoding apparatus being fed by said further detection/amending means for decoding the correctible data to correctly decoded data for forwarding to a user. An elementary decoder is sufficient to allow a relatively robust protection level to be fully utilized.

The invention also relates to a storage medium including data generated by the encoding method of the foregoing, and having a plurality of uniform-sized storage locations each accommodating storage of an encoded data unit and an associated discrepancy identifier, and the medium allowing location-wise access thereto. In particular, the medium can be in various realizations, such as matrix-organized, in particular an EEPROM or similar memory type. Another realization uses a linear storage format.

Further advantageous aspects of the invention are recited in dependent Claims.

BRIEF DESCRIPTION OF THE DRAWING

These and other aspects of the invention will be discussed more in detail with reference to the disclosure of preferred embodiments hereinafter, and in particular with reference to the appended Figures that show.

DETAILED DESCRIPTION OF PREFERRED EMBODIMENTS

Figure 1:
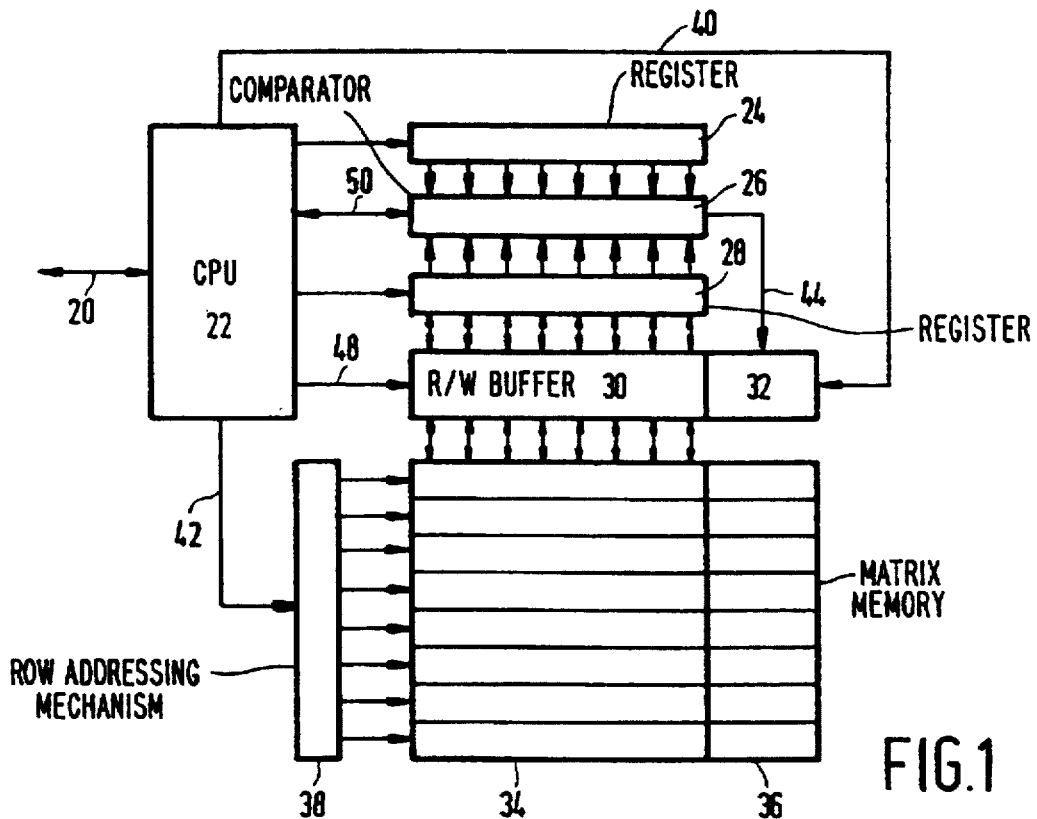
FIG. 1, a general block diagram of an encoding device according to the invention.

FIG. 1 shows a general block diagram of an encoding device according to the invention. Data to be stored is received along interconnection 20 in central processing and control device 22. This device implements an error protecting code. The encoded data so formed is presented to registers 24 and 28. Register 28 is bidirectionally connected to read/write buffer 30 that interfaces to matrix memory 34. In conjunction with the data reception, matrix memory 34 receives a row address along line 42 in row addressing mechanism 38. Furthermore, read/write buffer 30 receives a write control signal so that the content of register 28 is written at the so-addressed row. For a check, the same row is addressed once more in read mode, and the data read out is stored in register 28, therewith overwriting old data in that register. Next, comparing device 26 under control of an enabling signal on line 50 from central processing and control device 22 compares the contents of registers 24 and 28. If identical, device 26 sends a 'ready' signal on bidirectional connection 50 to central processing and control device 22, thus enabling it to prepare storage of a next memory row. If non-identical, comparator 26 generates a discrepancy identifier from the difference and sends a signal 'store discrepancy identifier' to central processing and control device 22. The discrepancy identifier is via line 44 sent to write buffer 32. Under control of a signal on line 42 and a write control signal on line 40, the discrepancy identifier is stored in part 36 of the matrix memory that specifically accommodates thereto. The manner in which the discrepancy identifier is coded will be described hereinafter; a particular dummy value, such as all-zero, may signal identify between stored data and encoded data. Subsequently, the system is ready to prepare storage of a next memory row. For brevity, the organization and timing of the storage cycles has not been discussed further. The memory may be EPROM or EEPROM, but also, a fuse-programmable memory or even an S-RAM would be fully operative. The discrepancy identifier may indicate the position of a particular non-conforming bit, for example, the one with the lowest rank in the word, but other solutions are possible. The discrepancy identifier may in principle indicate more than one non-conforming bit.

Figure 2:
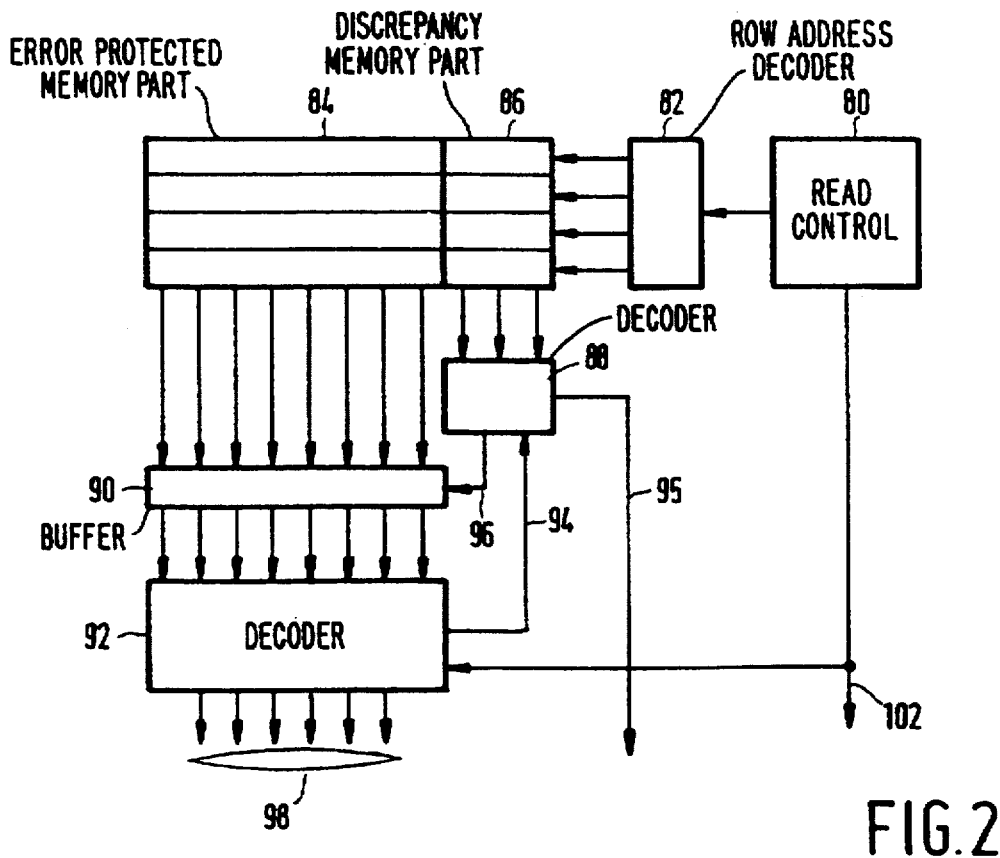
FIG. 2, a general block diagram of a decoding device according to the invention.

FIG. 2 is a general block diagram of a decoding device according to the invention. Block 80 executes read control upon request by an external entity not shown. First, row address decoder 82 receives the row address, and the necessary timing and read enabling signals. The information read out is sent towards standard decoder 92 via buffer 90. On its data output 98 the decoder will produce the corrected data if correctible, or if applicable, provided with signalization of an undecoded error situation on line 94. Either upon reception of the latter signalization or immediately at the beginning, the discrepancy identifier read out from memory part 86 is decoded in decoder 88. If the discrepancy identifier indicates unreliable data, this is signalled on line 95 to a user. If the latter decoding reveals the location of an error bit, this location is sent to buffer 90 that has been provided with inverter functionality that inverts the associated bit received from the error protected data part stored in memory part 84. The information so amended is forwarded to standard decoder 92 that generally will now be able to correct the information received from part 84. Line 102 carries a synchronization signal to decoder 92 as well as to a user. For brevity, further control and enabling signals have been ignored.

The above decoding organization has been based on a single error correction, double error detection distance 4 code, which the invention lends the capability for double-bit error correction. By itself, construction of even distance codes that include pointing at a suspect position has been disclosed in P. Larson, "Codes for Correction of Localized Errors", Ph.D. Thesis, Dept. of El. Eng., Linköping University (Sweden), 1995, pp. 44–46. A second publication by the same author is in Proc. EIDMA Winter Meeting on Coding Theory, Information theory, and Cryptology, Veldhoven (NL), December 1994, p. 30. The encoding and decoding strategies of the present invention have not been disclosed in the above identified references.

Figure 3:
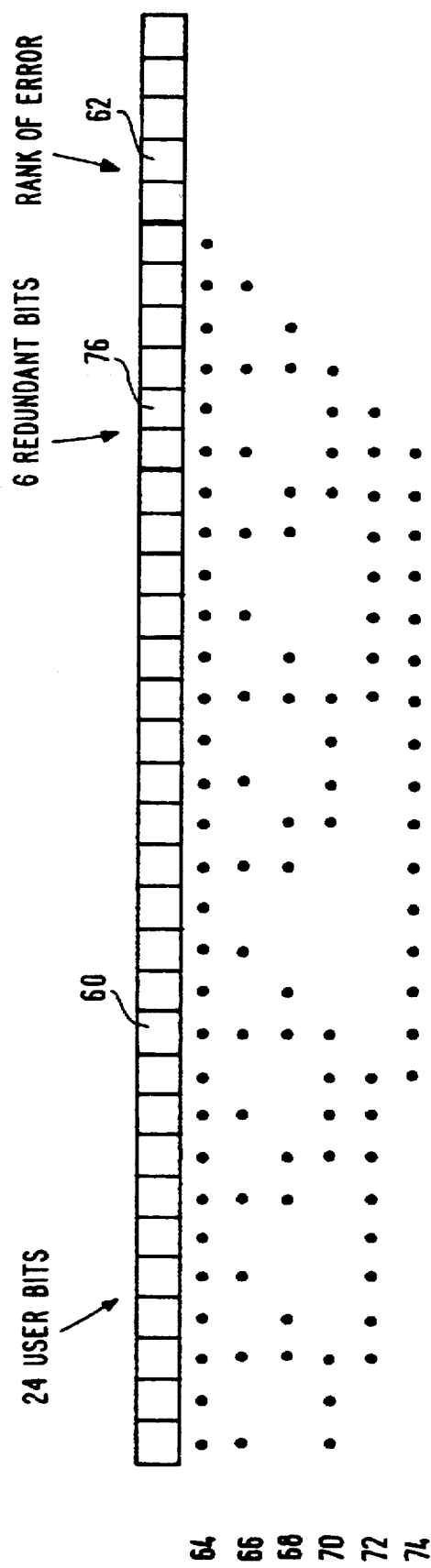
FIG. 3, a particular coding scheme to be used.

FIG. 3 shows a particular coding scheme to be used in the invention. Here, a single bit error correcting, double bit error detecting [30,24,4] Hamming bit code is used as an error protective code. Herein, block 60 contains the 24 user bits. Block 76 contains 6 redundant bits. Of these, 5 bits suffice to attain single-bit error correction. The sixth bit raises that level to simultaneous single-bit error correction and double bit error protection, corresponding to distance 4. In fact, distance 4 also allows triple bit error detection. Lines 64–74 show the formation of the six parity bits as follows. As indicated by the dots on line 64, the sixth parity bit is generated by even parity on all bits. The fifth parity bit is generated by even parity on all odd numbered bits, and so on for the further parity bits. The code as shown up to now is known in the art.

Now, if upon immediate read-out after first writing a single bit error is found, the rank thereof is stored in the five remaining bits in part 62. The rank may be coded from 00001 to 11110 (HEX 1E). The absence of error may be represented by a dummy identifier (00000). If two errors are found, the rank of the first one is indicated by the discrepancy identifier. If three or more errors are found, an URD code 11111 (1F) is stored, signalling UnReliable Data.

Upon later read out, first the standard decoding is undertaken for this particular code. If the decoding is successful, the reconstructed data is available to a user. If the amount of errors is too high, the outcome will generally be an incorrectibility signalization. In rather improbable situations, the errors will map the erroneous data word on another code word or rather on a data word that is correctable another to code word.

If incorrectibility is detected, the discrepancy identifier is inspected, to find an error that had been detected originally upon first write. The following codes may be found therein:

1. URD code true: three or more errors at writing

2. Discrepancy identifier: one error at write, one more later

3. Dummy identifier: zero error at write, two more later

4. Discrepancy identifier: two errors at write, no more later

5. Discrepancy identifier: two errors at write, one more later

6. Discrepancy identifier: one error at write, two more later

The result of these six cases is now as follows. The result of case 1 is that the stored data was already beyond correction, and an unreliability signal is sent to a user. In case 2, the original error is directly pointed at; after inversion thereof, the decoding will present correct data. In case 3, the decoding also after access of the discrepancy identifier will signal correctly the presence of exactly two incorrectible bit errors. Case 4 gives the same result as case 2: one error is inverted through the discrepancy identifier. Thereafter, the second error becomes correctable. Cases 5 and 6 are beyond correction, but also here, after inversion of the bit error identified by the discrepancy identifier, the presence of exactly two bit errors is correctly signalled. In all cases, an optimistic view is held. For example in the last case, three later errors may or may not lead to a corrected word; correction or even detection are not guaranteed. In the above cases, the later errors are supposed to occur in the encoded data. On the other hand, also the discrepancy identifier may comprise the extra error. In general, this will lead to pointing at an erroneous discrepancy position. The result of the decoding will then be dependent on the existence of an earlier error in the encoded data. If none, full correction is attained. If one, two errors are detected. The other possibilities will be clear now.

The coding scheme used is particularly advantageous through the properties of the distance 4 code. First, the error protectivity is relatively high. Second, the decoding is extremely simple because the discrepancy identifier may control the correcting of one error simply through inverting. For example, a conventional [35,24,5] code may also correct two errors, but necessitates a decoder of much greater complexity. The only advantage of the latter code is that the two errors may occur at any instant in time. According to the present invention, the two-error correctability requires that one error occurs at first write. However, in practice this is no disadvantage, because in the environment of a matrix memory, in particular an EEPROM or the like, a great fraction of the errors will occur at the write operation. Moreover, the present invention, in case at least one error occurs at the original write phase, guarantees three error detection (including one original write error).

A very straightforward organization is the following. Let the tail point to an error position found during read-back, and add a parity bit over the tail to get odd parity. If at later read-out the tail has odd weight, the original error protection code is used without heeding the tail. If the tail has even weight however, the bit to which it is pointing, is inverted, and the original error protecting code is used on the information so modified.

In similar manner a Reed-Solomon code may be used. For example, with a user word of 24 bytes, adding four bytes would provide double byte error correctability. If now, upon reading directly after encoding, the storage is found to have one or more erroneous bytes, the rank numbers of the first two thereof are stored as discrepancy identifier. This allows the decoder later on to directly go to a two-erasure, one error strategy. Usually it is preferable to store the rank number of each erroneous byte also in the form of a byte, in case the hardware used is byte-oriented. However, this is not a prequisite. Now in the situation described, the erasure is generally treated by a standard correcting procedure, because the one-bit inversion technique is not possible here. In fact, the erasure may be brought about by an arbitrary bit error pattern in the erroneous byte or bytes. In particular, the procedure considered for Reed-Solomon codes can be used advantageously for an arbitrary code distance. Also here, the decoding is much easier than would be the case when the discrepancy identifier were replaced by extra distance producing symbols of the Reed-Solomon code.

We claim:

1. A method for error-protective encoding of data, said method comprising the steps of:

encoding the data by an error protecting code to encoded data storing the encoded data in a medium as stored data reading the stored data from the medium and comparing with the encoded data, characterized by upon detecting a particular discrepancy between stored data and encoded data, generating a discrepancy identifier storing the discrepancy identifier in association with the stored data as stored identifier, thereby raising error protection offered by said error protecting code.

2. A method as claimed in claim 1, wherein absent detecting of a discrepancy, a dummy identifier is stored.

3. A method as claimed in claim 1, wherein said discrepancy as identified by the discrepancy identifier is within the error correcting capability of the error protecting code.

4. A method as claimed in claim 1, wherein said error protecting code is a block code.

5. A method as claimed in claim 1, wherein said error protecting code is a bit error correcting code, and said discrepancy identifier is a bit error identifier.

6. A method as claimed in claim 1, wherein said error correcting code is a Hamming code or a Reed Solomon code.

7. A method as claimed in claim 1, wherein said medium is a read-only medium.

8. A method as claimed in claim 7, wherein said medium is matrix-organized.

9. The method of claim 1 wherein the discrepancy identifier includes an indication of a number of errors encountered in storing and/or reading the data.

10. A device for error-protective encoding of data, said device comprising:

an error protecting encoder for encoding the data to encoded data memory means for storing the data memory access means for writing the encoded data in the memory as stored data and for reading the stored data from the medium comparing means connected to said access means for comparing the encoded data with the stored data, characterized by secondary encoding means fed by the comparing means for, under control of detection of a particular discrepancy between stored data and encoded data, generating a discrepancy identifier for presentation to said memory access means, for storing the discrepancy identifier with the stored data as stored identifier as additional error protection for said stored data.

11. A device as claimed in claim 10, wherein said medium is a read-only medium.

12. A device as claimed in claim 11, wherein said medium is matrix-organized.

13. The device of claim 10 wherein the discrepancy identifier includes an indication of a number of errors encountered in storing and/or reading the data.

14. A method for decoding data that has been encoded according to a method for error-protective encoding of data, said method comprising the steps of:

encoding the data by an error protecting code to encoded data storing the encoded data in a medium as stored data reading the stored data from the medium and comparing with the encoded data, characterized by upon detecting a particular discrepancy between stored data and encoded data generating a discrepancy identifier storing the discrepancy identifier in association with the stored data as stored identifier, thereby raising error protection offered by said error protecting code, said decoding method comprising the steps of reading and decoding said encoded data, and upon so attaining correctly decoded data forwarding said decoded data to a user, and furthermore, accessing discrepancy identifier sorted in association with the encoded data, under control of said discrepancy identifier amending said encoded data to correctable data, and decoding the correctable data to correctly decoded data for forwarding to a user.

15. A method as claimed in claim 14, combined with detecting an UnReliable Data value in said discrepancy identifier and thereupon signalling an unreliability signal to a user.

16. A device for decoding data that has been encoded according to a method, for error-protective encoding of data, said method comprising the steps of:

encoding the data by an error protecting code to encoded data storing the encoded data in a medium as stored data reading the stored data from the medium and comparing with the encoded data, characterized by upon detecting a particular discrepancy between stored data and encoded data generating a discrepancy identifier storing the discrepancy identifier in association with the stored data as stored identifier, thereby raising error protection offered by said error protecting code, said device comprising medium access means for reading and decoding said encoded data, detection means fed by said access means for detecting correctly decoded data for forwarding said decoded data to a user, furthermore detection/amending means for accessing a discrepancy identifier co-stored with the encoded data, and under control of said discrepancy identifier amending said encoded data to correctable data, and said decoding being fed by said further detection/amending means for decoding the correctable data to correctly decoded data for forwarding to a user.

17. A device as claimed in claim 16, wherein said detection means have an UnReliable Data output for under control of an UnReliable Data value in said discrepancy identifier signalling an unreliability signal to a user.

18. The device of claim 16 wherein the discrepancy identifier includes an indication of a number of errors encountered in storing and/or reading the data.

19. A storage medium generated by a method, for error-protective encoding of data, said method comprising the steps of:

encoding the data by an error protecting code to encoded data storing the encoded data in a medium as stored data reading the stored data from the medium and comparing with the encoded data, characterized by upon detecting a particular discrepancy between stored data and encoded data generating a discrepancy identifier storing the discrepancy identifier in association with the stored data as stored identifier, thereby raising error protection offered by said error protecting code, the storage medium being for interfacing to a device comprising medium access means for reading and decoding said encoded data, detection means fed by said access means for detecting correctly decoded data for forwarding said decoded data to a user, furthermore detection/amending means for accessing a discrepancy identifier co-stored with the encoded data, and under control of said discrepancy identifier amending said encoded data to correctable data, and said decoding being fed by said further detection/amending means for decoding the correctable data to correctly decoded data for forwarding to a user, said medium having a plurality of uniform-sized storage locations each accommodating storage of an encoded data unit and an associated discrepancy identifier, and said medium allowing location-wise access thereto.

20. The medium of claim 19 wherein the discrepancy identifier includes an indication of a number of errors encountered in storing and/or reading the data.

* * * * *